(12) United States Patent
LeCrone et al.

(10) Patent No.: US 10,437,497 B1
(45) Date of Patent: Oct. 8, 2019

(54) ACTIVE-ACTIVE HOST ENVIRONMENT

(71) Applicant: EMC IP Holding Company LLC, Hopkinton, MA (US)

(72) Inventors: Douglas E. LeCrone, Hopkinton, MA (US); Paul A. Linstead, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/871,324

(22) Filed: Sep. 30, 2015

(51) Int. Cl.
*G06F 3/06* (2006.01)

(52) U.S. Cl.
CPC .......... *G06F 3/0634* (2013.01); *G06F 3/0617* (2013.01); *G06F 3/0689* (2013.01)

(58) Field of Classification Search
CPC ...... G06F 3/06–0689; G06F 2003/0691–0698; G06F 12/00–16
See application file for complete search history.

(56) References Cited

U.S. PATENT DOCUMENTS

| | | | | |
|---|---|---|---|---|
| 5,124,987 A * | 6/1992 | Milligan | ............... | G06F 3/0601 714/6.32 |
| 8,370,592 B1 * | 2/2013 | Specht | ............... | G06F 11/3034 707/661 |
| 8,819,374 B1 * | 8/2014 | Don | ............ | G06F 3/0647 711/112 |
| 10,067,888 B1 | 9/2018 | LeCrone et al. | | |
| 2003/0140183 A1 * | 7/2003 | Goode | ............ | G06F 3/0601 710/6 |
| 2005/0262317 A1 * | 11/2005 | Nakanishi | ............ | G06F 3/0613 711/162 |
| 2014/0330787 A1 * | 11/2014 | Modukuri | ............... | G06F 11/20 707/659 |
| 2015/0095599 A1 * | 4/2015 | Sueda | ............ | G06F 3/065 711/162 |

* cited by examiner

*Primary Examiner* — Nicholas J Simonetti
(74) *Attorney, Agent, or Firm* — Muirhead and Saturnelli, LLC

(57) ABSTRACT

Accessing at least two separate physical storage devices as a single logical device includes receiving data/metadata from both of the separate physical storage devices and causing the data/metadata to appear to be coming from only one of the storage devices by spoofing data/metadata from at least one of the storage devices to appear to be coming from the other of the storage devices. Spoofing data/metadata may include revising storage device identifiers. The storage device identifiers may include serial numbers and port identifiers.

18 Claims, 11 Drawing Sheets

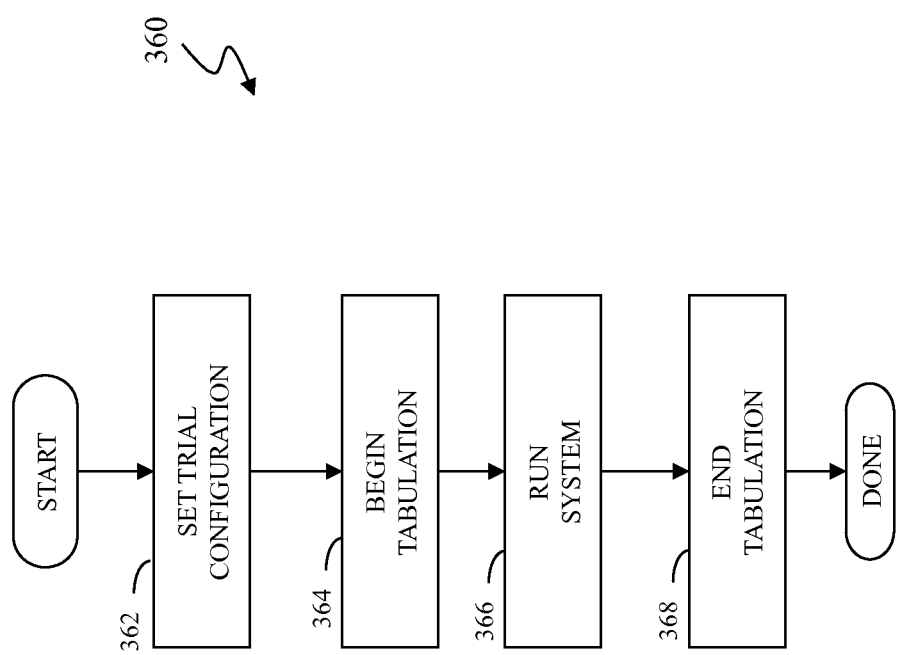

ACTIVE-ACTIVE HOST ENVIRONMENT

TECHNICAL FIELD

This application relates to the field of computer systems and storage devices therefor and, more particularly, to the field of storage access and I/O operations among computing systems and storage devices.

BACKGROUND OF THE INVENTION

Host processor systems may store and retrieve data using a storage device containing a plurality of host interface units (I/O modules), disk drives, and disk interface units (disk adapters). The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to any one of the actual disk drives. Allowing multiple host systems to access the single storage device unit allows the host systems to share data stored therein.

In some cases, it is possible to provide redundant storage that maintains a mirror copy of data provided by a host computing system. In such systems, the redundant storage devices act as a single logical storage device for any computing devices coupled thereto. Writes are provided to one of the storage devices and are automatically copied to the other storage device for mirroring. Data can be read from either storage device. If one of the storage devices fails, the other storage device maintains operations automatically without having to manually switch or reconfigure the system. In some cases, the failed storage device can be replaced without the need to interrupt operations. However, some systems, such as systems provided by IBM Corporation, are not inherently capable of communicating with separate physical storage devices configured as a single logical device. These systems contain safeguards to prevent such a configuration, which mimics host to storage device coupling errors.

Accordingly, it is desirable to provide a mechanism that allows for redundant storage devices that can be maintained as a single logical device in systems that would otherwise not allow such a configuration.

SUMMARY OF THE INVENTION

According to the system described herein, accessing at least two separate physical storage devices as a single logical device includes receiving data/metadata from both of the separate physical storage devices and causing the data/metadata to appear to be coming from only one of the two separate physical storage devices by spoofing data/metadata from at least one of the two separate physical storage devices to appear to be coming from the other of the two separate physical storage devices. Accessing at least two separate physical storage devices as a single logical device may also include determining if metadata is to be provided to a specific one of the storage devices or for any one of the storage devices, directing the metadata to the specific one of the storage devices in response to the metadata to be provided to the specific one of the storage devices, where data initially directed to one of the two separate physical storage devices is modified to be directed to the other one of the two separate physical storage devices, and directing the metadata to any one of the two separate physical storage devices in response to the metadata to be provided to any one of the storage devices. Following directing the metadata to any one of the two separate physical storage devices, the any one of the two separate physical storage device may forward the metadata to an other one of the two separate physical storage devices using a data link therebetween. The other one of the two separate physical storage devices may handle metadata received via the data link as if the metadata were provided directly by a host. Spoofing data/metadata may include revising storage device identifiers. The storage device identifiers may include serial numbers and port identifiers.

According further to the system described herein, a non-transitory computer-readable medium contains software that accesses at least two separate physical storage devices as a single logical device. The software includes executable code that receives data/metadata from both of the separate physical storage devices and executable code that causes the data/metadata to appear to be coming from only one of the two separate physical storage devices by spoofing data/metadata from at least one of the two separate physical storage devices to appear to be coming from the other of the two separate physical storage devices. The software may also include executable code that determines if metadata is to be provided to a specific one of the storage devices or for any one of the storage devices, executable code that directs the metadata to the specific one of the storage devices in response to the metadata be provided to the specific one of the storage devices, where data initially directed to one of the two separate physical storage devices is modified to be directed to the other one of the two separate physical storage devices, and executable code that directs the metadata to any one of the two separate physical storage devices in response to the metadata to be provided to any one of the storage devices. Following directing the metadata to any one of the two separate physical storage devices, the any one of the two separate physical storage device may forward the metadata to an other one of the two separate physical storage devices using a data link therebetween. The other one of the two separate physical storage devices may handle metadata received via the data link as if the metadata were provided directly by a host. Spoofing data/metadata may include revising storage device identifiers. The storage device identifiers may include serial numbers and port identifiers.

According further to the system described herein, a system includes a first storage device, a second storage device coupled to the first storage device, and a host that accesses the storage devices as a single logical device, where the host receives data/metadata from both of the storage devices and causes the data/metadata to appear to be coming from only the first storage device by spoofing data/metadata from the second storage device to appear to be coming from the first storage device. The host may also determine if metadata is to be provided to a specific one of the storage devices or for any one of the storage devices, direct the metadata to the specific one of the storage devices in response to the metadata to be provided to the specific one of the storage devices, where data initially directed to one of the storage devices is modified to be directed to the other one of the storage devices and direct the metadata to any one of the storage devices in response to the metadata to be provided to any one of the storage devices. Following directing the metadata to any one of the storage devices, the any one of the storage device may forward the metadata to an other one of the storage devices using a data link therebetween. The other one of the storage devices may handle metadata received via the data link as if the metadata were provided directly by a host. Spoofing data/metadata may include revising storage device identifiers. The storage device identifiers may include serial numbers and port identifiers.

BRIEF DESCRIPTION OF THE DRAWINGS

Embodiments of the system are described with reference to the several figures of the drawings, noted as follows.

FIG. 8 is a flow diagram illustrating use of a planning tool according to an embodiment of the system described herein according to an embodiment of the system described herein.

DETAILED DESCRIPTION OF VARIOUS EMBODIMENTS

Figure 1:
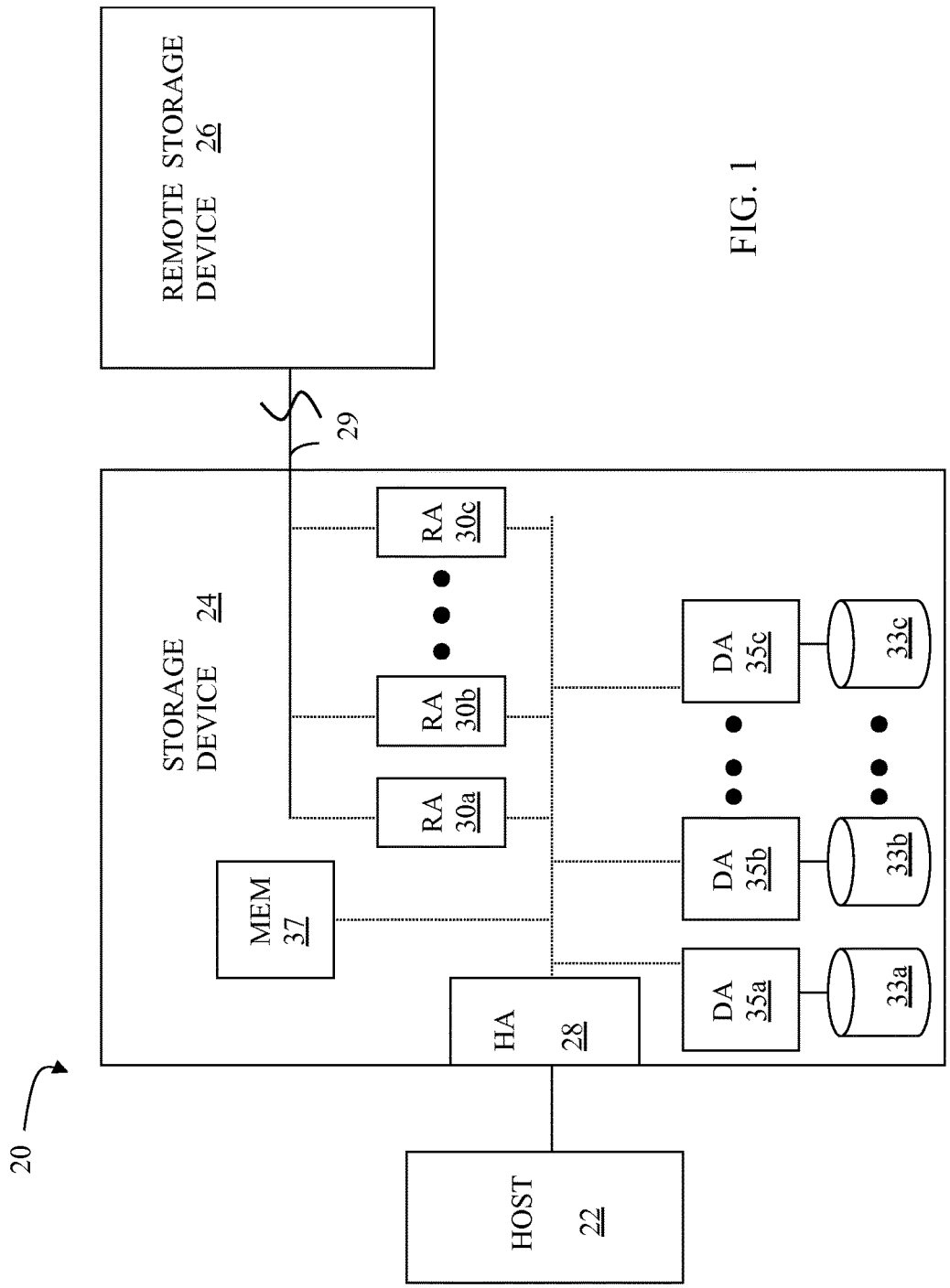
FIG. 1 is a schematic illustration of a storage system showing a relationship between a host and a storage device that may be used in connection with an embodiment of the system described herein.

FIG. 1 is a schematic illustration of a storage system 20 showing a relationship between a host 22 and a storage device 24 that may be used in connection with an embodiment of the system described herein. In an embodiment, the storage device 24 may be a Symmetrix storage system produced by EMC Corporation of Hopkinton, Mass.; however, the system described herein may operate with other appropriate types of storage devices. Also illustrated is another (remote) storage device 26 that may be similar to, or different from, the storage device 24 and may, in various embodiments, be coupled to the storage device 24, for example, via a network. The host 22 reads and writes data from and to the storage device 24 via an HA 28 (host adapter), which facilitates an interface between the host 22 and the storage device 24. Although the diagram 20 only shows one host 22 and one HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the storage device 24 may be copied to the remote storage device 26 via a link 29. For example, the transfer of data may be part of a data mirroring or replication process, that causes data on the remote storage device 26 to be identical to the data on the storage device 24. Although only the one link 29 is shown, it is possible to have additional links between the storage devices 24, 26 and to have links between one or both of the storage devices 24, 26 and other storage devices (not shown). The storage device 24 may include a first plurality of remote adapter units (RA's) 30a, 30b, 30c. The RA's 30a-30c may be coupled to the link 29 and be similar to the HA 28, but are used to transfer data between the storage devices 24, 26.

The storage device 24 may include one or more disks (including solid state storage), each containing a different portion of data stored on each of the storage device 24. FIG. 1 shows the storage device 24 having a plurality of disks 33a, 33b, 33c. The storage device (and/or remote storage device 26) may be provided as a stand-alone device coupled to the host 22 as shown in FIG. 1 or, alternatively, the storage device 24 (and/or remote storage device 26) may be part of a storage area network (SAN) that includes a plurality of other storage devices as well as routers, network connections, etc. (not shown). The storage devices may be coupled to a SAN fabric and/or be part of a SAN fabric. The system described herein may be implemented using software, hardware, and/or a combination of software and hardware where software may be stored in a computer readable medium and executed by one or more processors.

Each of the disks 33a-33c may be coupled to a corresponding disk adapter unit (DA) 35a, 35b, 35c that provides data to a corresponding one of the disks 33a-33c and receives data from a corresponding one of the disks 33a-33c. An internal data path exists between the DA's 35a-35c, the HA 28 and the RA's 30a-30c of the storage device 24. Note that, in other embodiments, it is possible for more than one disk to be serviced by a DA and that it is possible for more than one DA to service a disk. The storage device 24 may also include a global memory 37 that may be used to facilitate data transferred between the DA's 35a-35c, the HA 28 and the RA's 30a-30c. The memory 37 may contain tasks that are to be performed by one or more of the DA's 35a-35c, the HA 28 and/or the RA's 30a-30c, and may contain a cache for data fetched from one or more of the disks 33a-33c.

The storage space in the storage device 24 that corresponds to the disks 33a-33c may be subdivided into a plurality of volumes or logical devices. The logical devices may or may not correspond to the physical storage space of the disks 33a-33c. Thus, for example, the disk 33a may contain a plurality of logical devices or, alternatively, a single logical device could span both of the disks 33a, 33b. Similarly, the storage space for the remote storage device 26 may be subdivided into a plurality of volumes or logical devices, where each of the logical devices may or may not correspond to one or more disks of the remote storage device 26.

Figure 2:
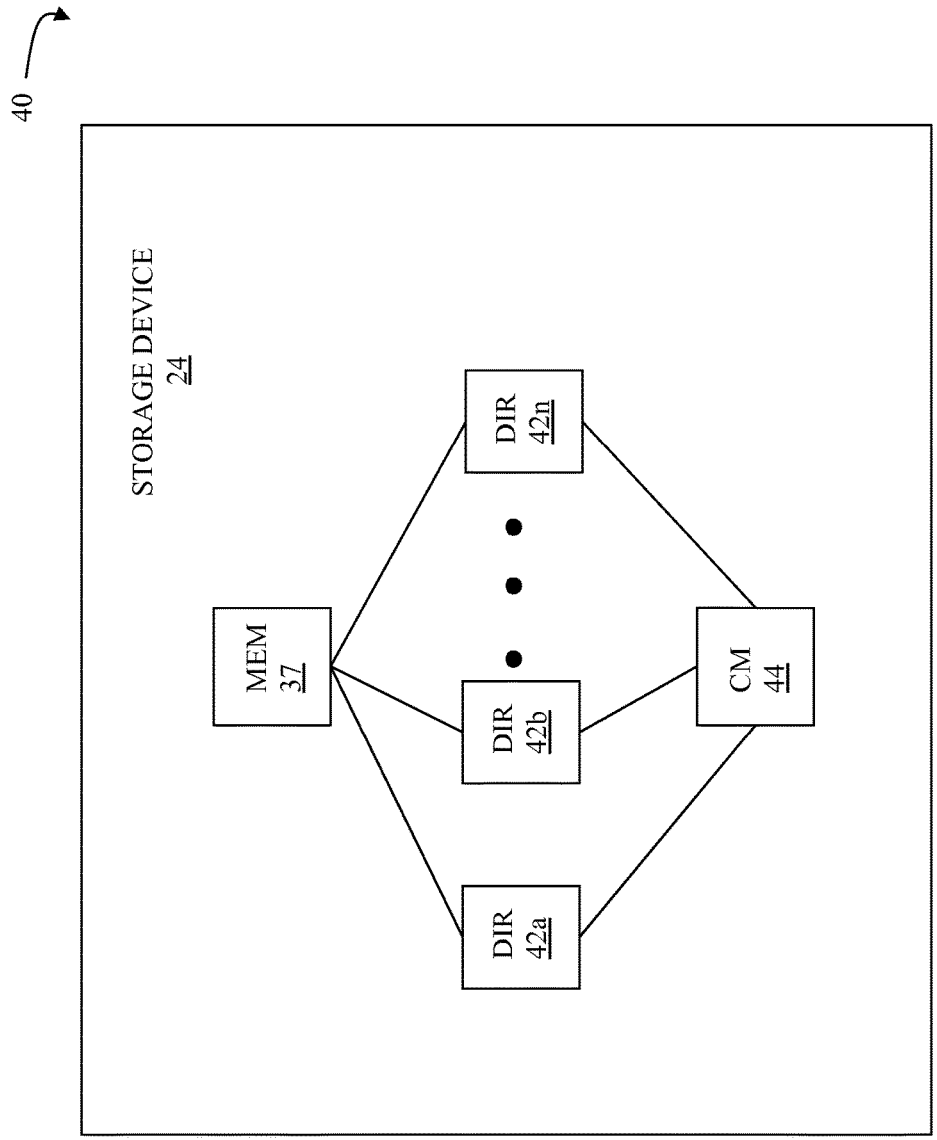
FIG. 2 is a schematic diagram illustrating an embodiment of the storage device where each of a plurality of directors are coupled to the memory.

FIG. 2 is a schematic diagram 40 illustrating an embodiment of the storage device 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 26. The CM 44 may be implemented using conventional MUX/router technology where a sending one of the directors 42a-42n provides an appropriate address to cause a message and/or data to be received by an intended receiving one of the directors 42a-42n. Some or all of the functionality of the CM 44 may be implemented using one or more of the directors 42a-42n so that, for example, the directors 42a-42n may be interconnected directly with the interconnection functionality being provided on each of the directors 42a-42n. In addition, a sending one of the directors 42a-42n may be able to broadcast a message to all of the other directors 42a-42n at the same time.

In some embodiments, one or more of the directors 42a-42n may have multiple processor systems thereon and thus may be able to perform functions for multiple directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage device 24 may be provided as one or more director boards having CPUs, memory (e.g., DRAM, etc.) and interfaces with Input/Output (I/O) modules.

Figure 3:
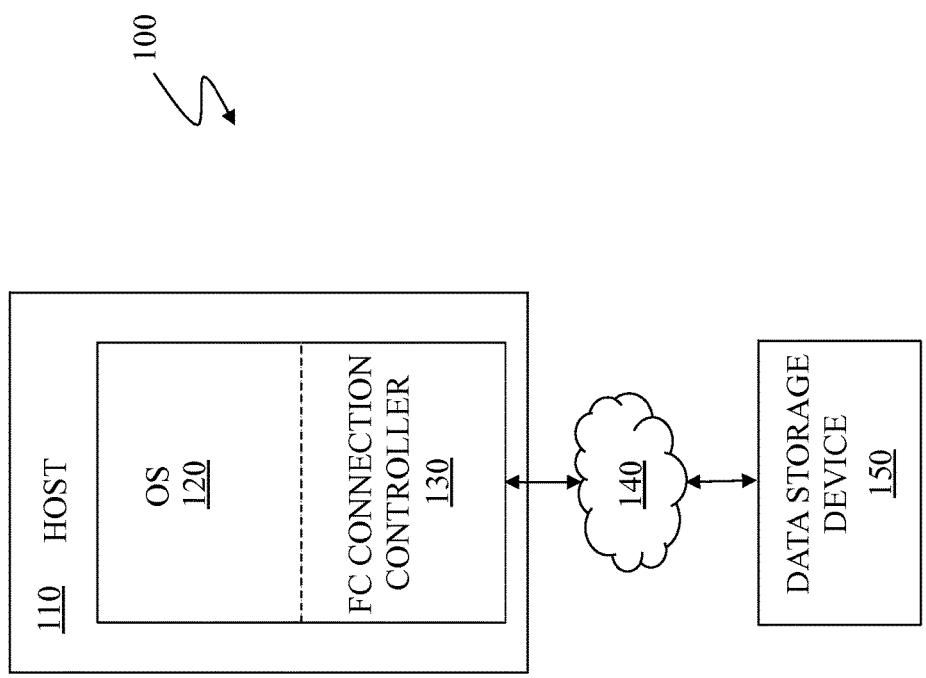
FIG. 3 is a schematic illustration showing a system with a FICON connection between a host and a data storage device according to an embodiment of the system described herein.

FIG. 3 is a schematic illustration showing a system 100 with a FICON connection controller 130 for providing FICON connection between a host 110 and a data storage device 150 according to an embodiment of the system described herein. In an embodiment, the host 110 may be a computer running Linux, z/OS or some other appropriate operating system 120. The I/O processing on the host 110 may operate with the FICON connection controller 130 to enable I/O operations with the data storage device 150. The FICON connection controller 130 may send and receive data to and from the data storage device 140 using a remote connection mechanism 140, that may include a network (such as the Internet, and appropriate connection thereof). The data storage device 150 may include physical storage volumes and/or logical volumes, such as EMC Corporation's Symmetrix data storage facility. The FICON connection controller 130 may act as an I/O subsystem providing FICON communication capability. The data storage device 150 may include features and/or components enabling the Fibre channel communication with the host 110. For a discussion of features and implementations of FICON systems and suitable Fibre channel protocols operating therewith on z/Architecture computing systems, reference is made to J. Entwistle, "IBM System z10 FICON Express8 FCP Channel Performance Report," Technical paper, Aug. 2009, 27 pp., which is incorporated herein by reference.

It is noted that various components of the system 100 may be emulated. For further discussion of emulation of I/O computing components, particular Fibre Channel connection components, reference is made to U.S. patent application Ser. No. 14/133,852 to Jones et al., filed Dec. 19, 2013, entitled "Virtual I/O Hardware" and U.S. patent application Ser. No. 12/215,984 to LeCrone et al., filed Jun. 8, 2008, entitled "I/O Fault Injection Using Simulated Computing Environments," which are both incorporated herein by reference. Accordingly, in various embodiments, the system described herein provides for use of a channel emulator to emulate data transfer paths in I/O operations, and in which the channel emulator may simulate a host channel to provide I/O connectivity with an I/O device and may provide for the I/O connectivity using different channel protocols.

The connection mechanism 140 may include an Internet connection and/or possibly some other types of connection (s). In an embodiment herein, the connection mechanism 140 may be directly incompatible with a FICON connection. The incompatibility may be hardware incompatibility, software incompatibility, or both. Such connection mechanism 140 may not support a direct FICON connection but, instead, rely on a FICON emulator (and/or other emulator (s)) for providing data in an appropriate format. It is further noted that where FICON emulation is being performed, the data storage device 150 may include or be coupled to a FICON emulator portion that may send and receive data to and from the connection mechanism 140 and also emulates a Fibre Channel FCO physical layer for the benefit of the data storage device 150. Thus, in such case involving emulation, both the host 110 and the data storage device 150 may operate as if the devices 110, 150 were communicating using a FICON hardware connection.

In an embodiment, the system described herein may be used with IBM's z High Performance FICON (zHPF) transport mode protocol implementation. zHPF enhances z/Architecture and FICON interface architecture to improve data transfer processing. In z/OS, standard FICON architecture operates with the command mode protocol, and a zHPF architecture operates with the transport mode protocol.

zHPF provides a Transport Control Word (TCW) that facilitates the processing of an I/O request by the channel and the controller. The TCW enables multiple channel commands to be sent to the controller as a single entity (instead of being sent as separate commands as in a FICON channel command word (CCW)). The channel no longer has to process and keep track of each individual CCW. The channel forwards a chain of commands to the controller for execution. zHPF capable channels may support both FICON and zHPF protocols simultaneously. For a more detailed discussion of zHPF, reference is made, for example, to C. Cronin, "IBM System z10 I/O and High Performance FICON for System z Channel Performance," Technical paper, IBM Corporation, Jan. 28, 2009, 33 pp., which is incorporated herein by reference.

For the system described herein, I/O operations for relatively large amounts of data are subdivided into a plurality of I/O operations, each for a subset of the data. Each of the plurality of I/O operations may then be executed in parallel. If multiple parallel pathways exist between the host and the target device, the plurality of I/O operations may be more efficient (complete faster) than a single I/O operation for all of the data at the same time. The system described herein relies on parallel pathways between the host and an I/O target device, which could either be a local storage device like the storage device 24 shown in FIG. 1, or could be a remote storage device, like the remote storage derive 26 also shown in FIG. 1. The system described herein may subdivide I/O operations in a way that does not adversely impact or require modifications of any applications running on the host 22.

Figure 4:
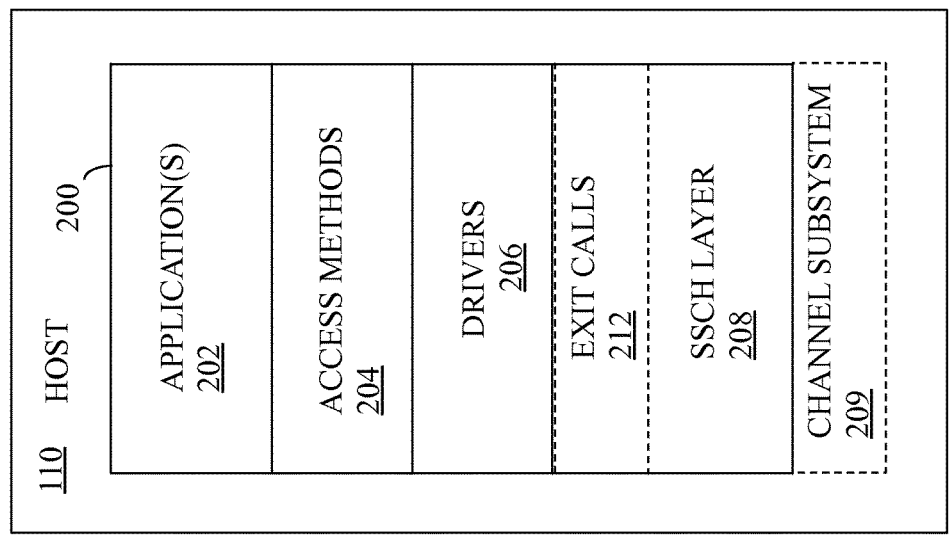
FIG. 4 is a schematic illustration showing software layers in a host according to an embodiment of the system described herein.

Referring to FIG. 4, the host 110 is illustrated with software 200 having an application(s) layer 202, an access methods layer 204, a drivers layer 206, an SSCH layer 208, a channel subsystem layer 209, and an exit calls layer 212. The application(s) layer 202 includes one or more software applications that run on the host 110. The access methods layer 204 includes I/O routines (e.g., read, write, open, etc.) that are used by applications in the application(s) layer 202 in connection with performing I/O operations. Software in the application(s) layer 202 calls specific routines in the access methods layer 204 to access data on a storage device coupled to the host.

The I/O routines in the access methods layer 204 call driver routines in the drivers layer 206 that perform lower-level device specific operations that depend upon the specific type of I/O device and the type of connection thereto. For example, a first driver for a Symmetrix storage device coupled to the host 110 by a FICON connection may be different than a second driver used for a different type of non-volatile storage device coupled to the host 110 using a different type of connection. Note, however, that an application in the application layer 202 may call the same routine (e.g., read) in the access layer 204 irrespective of the physical hardware (and connection there) used for the data, but that the routine in the access layer 204 that is called may call different routines in the drivers layer 206, depending upon a specific configuration/hardware of the system.

The SSCH layer 208 includes routines that perform low-level operations that make calls to the channel subsystem layer 209 to directly control the hardware used for I/O operations, including any storage devices and channels used from transferring data between the host 110 and the storage devices. Routines in the drivers layer 206 call routines in the SSCH layer 208 to perform hardware operations and to transfer data to and from the host 110 and to exchange status and control information to facilitate control of the I/O hardware.

The exit calls layer 212 provides a mechanism for inserting customized processing between the drivers layer 206 and the SSCH layer 208. For any of the routines in the drivers layer 206, it is possible to provide code for the exit layer 212 that is called when a corresponding routine in the drivers layer 206 exits just prior to calling code in the SSCH layer 208. For example, it is possible to provide code in the exit layer 212 that is called in connection with a particular read operation of a specific I/O device by inserting code in the exit layer 212 that is called when the driver for the particular read operation is being called. Thus, a possible sequence of operations is that a routine in the access methods layer 204 invokes the particular read operation in the drivers layer 206 which in turn evokes special processing in the exit layer 212 prior to making any calls to the SSCH layer 208. The exit layer 212 is used in connection with the system described herein, as explained in more detail below.

Figure 5:
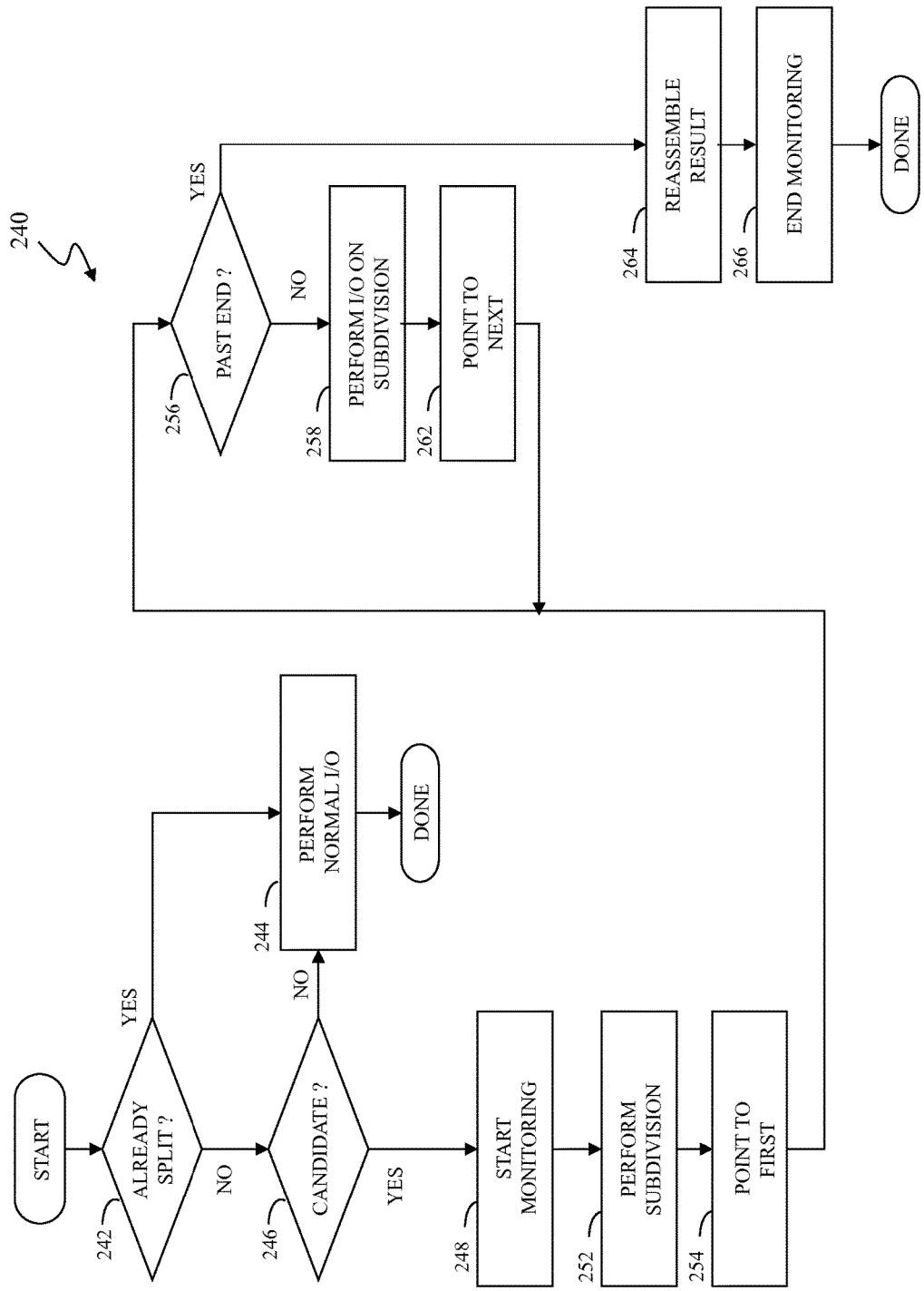
FIG. 5 is a flow diagram illustrating processing performed in connection with possibly subdividing an I/O operation according to an embodiment of the system described herein.

Referring to FIG. 5, a flow diagram 240 illustrates processing performed by software in the exit layer 212 used in connection with disk storage control, read, and write operations. In an embodiment herein, software is provided in the exit layer 212 to provide special processing in connection with storage device read and write calls. Generally, read and write calls that transfer a relatively large (multitrack) amount of data may be subdivided into a plurality of calls that are invoked in parallel and that access different subsets of the data. For example, a read call that reads track number 101 through track number 200 may be subdivided into a first call that reads track number 101 through track number 125, a second call that reads track number 126 through track number 150, a third call that reads track number 151 through track number 175, and a fourth call that reads track number 176 through track number 200. The first, second, third, and fourth calls may be invoked in parallel, which is beneficial in systems that support multi-channel parallel I/O operations. In such systems, it is possible that multiple calls to access smaller increments of data may be completed faster than a single call to access all of the data. In an embodiment herein, a track may contain approximately 50 k bytes of data, although the system may operate with larger or smaller track sizes.

Processing begins at a first step 242 where it is determined if the data being accessed has already been subdivided. In an embodiment herein, a data access operation is subdivided only one time, at most. Thus, for example, if a one hundred track read operation is first subdivided into two fifty track read operations, the resulting fifty track read operations would not be further subdivided. The test at the step 242 may be facilitated by a flag (or similar) that is set for access operations that are a result of a subdivision of a larger access operation. If it is determined at the step 242 that a particular access operation is a result of a previous subdivision, then control transfers from the test step 242 to a step 244 where a normal I/O operation is performed (i.e., conventional I/O processing that would occur if there were no software provided in the exit layer 212 for access operations). Following the step 244, processing is complete.

If it is determined at the test step 242 that the particular access operation is not a result of a subdivision of a previous access operation, then control transfers from the test step 242 to a test step 246 where it is determined if the access operation is a candidate for being subdivided into a plurality of I/O operations for different subsets of the data. The determination at the step 246 is described in more detail elsewhere herein, but may include a determination of whether the access operations accesses multiple track of data (including partial tracks) and whether it is expected that subdividing the access operation will result in an overall improvement of performance. If it is determined at the step 246 that the current access operation is not a candidate for being subdivided, then control transfers from the test step 246 to the step 244, described above, where a normal I/O operation is performed. Following the step 244, processing is complete.

If it is determined at the step 246 that the current access operation is a candidate for being subdivided, then control transfers from the test step 246 to a step 248 where performance monitoring is initiated for the operation. In an embodiment herein, performance monitoring of access operations that are subdivided is used in connection with determining whether to perform subdividing of subsequent access operations. For example, if the performance monitoring determines that subdividing access operations are generally resulting in less efficient I/O throughput (i.e., I/O operations are taking longer), then subsequent I/O operations are less likely to be subdivided.

Following the step 248 is a step 252 where the number of subdivided operations is determined. Note that there may be many ways to subdivide a large I/O operation. For example, a one hundred track read operation may be subdivided into two fifty track read operations, five twenty track read operations, twenty five track read operations, etc. The processing performed at the step 252 is described in more detail elsewhere herein.

Following the step 252 is a step 254 where an iteration pointer that iterates through the plurality of access operations that are the result of subdividing is set to point to the first of the plurality of operations. Following the step 254 is a test step 256 where it is determined if the iteration pointer points past the end of the plurality of access operations (i.e., if all of the access operations have been processed). If not, then control transfers from the test step 256 to a step 258 where a particular access operation indicated by the pointer is processed. For example, if the initial access operation is a read of one hundred tracks of data that is subdivided into four read operations of twenty-five tracks each, then the processing at the step 258 performs processing for one of the twenty-five track read operations for the subdivided access operation indicated by the iteration pointer. In an embodiment herein, the operation at the step 258 is performed by making a call to an appropriate routine in the driver layer 206 which will result in a corresponding call to the SSCH layer 208 (at the step 244, described above). Following the step 258, control transfers to a step 262 where the iteration pointer is incremented. Following the step 262, control transfers back to the step 256, discussed above, where it is determined if all of the plurality of access operations have been processed.

If it is determined at the test step 256 that all of the plurality of access operations have been processed, then control transfers from the test step 256 to a step 264 where the result of all of the subdivided access operations is reassembled to simulate an appropriate result for the initial I/O operation that was subdivided. For example, if the initial I/O operation was a read of one hundred tracks of data that was subdivided into ten access operations to read ten tracks each, the result of the ten separate read operations is reassembled at the step 264 to be a single result that would have been returned after reading one hundred tracks in a single I/O operation. Note that, since the step 258 may be performed by calling an appropriate routine in the driver layer, the step 264 may wait for completion of all of those calls (i.e., all of the I/O operations to complete) in order to be able to reassemble the results of those calls at the step 264. Following the step 264 is a step 266 where performance monitoring is ended. Following the step 266, processing is complete.

Figure 6:
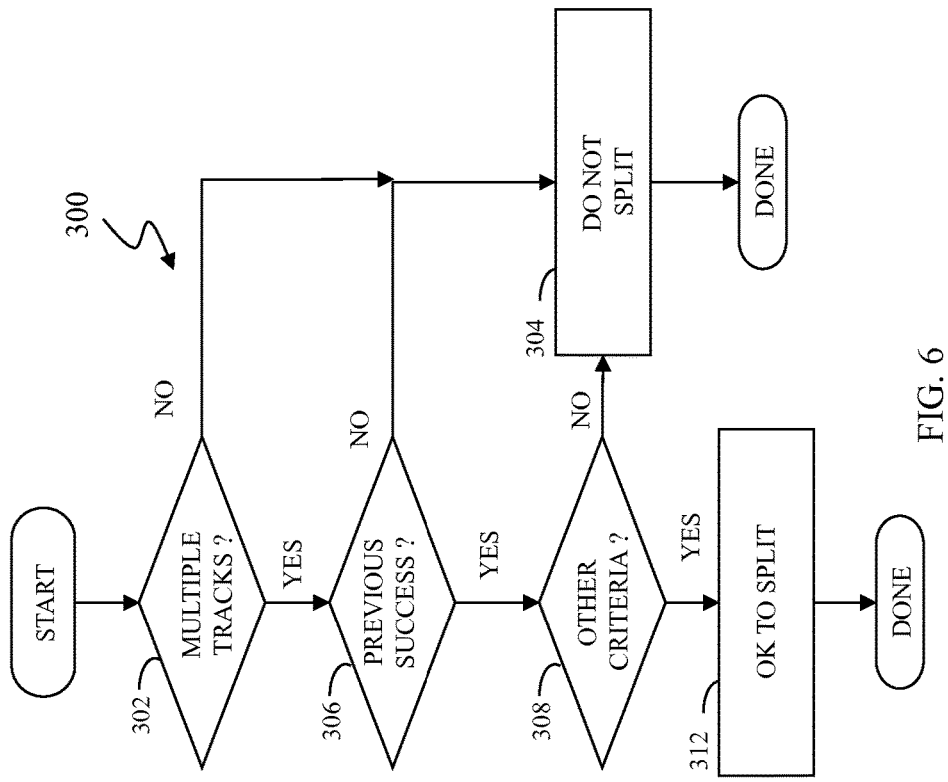
FIG. 6 is a flow diagram illustrating determining whether to subdivide an I/O operation according to an embodiment of the system described herein.

Referring to FIG. 6, a flow diagram 300 illustrates in more detail processing performed at the step 244, described above, where the system determines whether a particular I/O operation is a candidate to be subdivided into a plurality of I/O operations, each for a different portion of the data. Processing begins at a first test step 302 where the system determines if the I/O operation being examined is for a plurality of tracks (more than one track). In an embodiment herein, only I/O operations for multiple tracks are subdivided. Of course, in other embodiments, it may be possible to subdivide an I/O operation for a single track (e.g., for multiple blocks or records), but in that case, it may be useful to also coordinate with the storage device in instances where the storage device may automatically serialize (concatenate) different I/O operations for the same track. If it is determined at the test step 302 that an I/O operation is not for a plurality of tracks, then control transfers from the test step 302 to a step 304 where an indication (e.g., a flag) is set to cause the I/O operation to not be subdivided. Following the step 304, processing is complete.

If it is determined at the test step 302 that the I/O operation is for a plurality of tracks, then control transfers from the test step 302 to a test step 306 where it is determined if previous subdivisions have resulted in I/O efficiencies. In an embodiment herein, the system monitors whether subdividing I/O operations results in the I/O operations being more efficient (taking less time). See, for example, the steps 248, 266, described above. Note that subdividing I/O operations may become inefficient for any number of reasons, including limitations on the number of parallel I/O routes and overhead associated with subdividing the I/O operations. In an embodiment herein, the system may measure past efficiency according to a decaying weighting algorithm, where most recently monitored I/O subdivision operations are given greater weight. Thus, the effects of past inefficiencies are diminished as time passes. Determining performance/efficiency of splitting the data is discussed in more detail elsewhere herein. If it is determined at the step 306 that previous I/O subdivision operations have not provided sufficient I/O efficiencies, then control transfers from the step 306 to the step 304, discussed above, where an indication is set to cause the I/O operation to not be subdivided. Following the step 304, processing is complete.

If it is determined at the test step 306 that previous subdivisions have resulted in I/O efficiencies, then control transfers from the test step 306 to a test step 308 where other criteria is applied to determine if an I/O operation should be subdivided. The other criteria could be any characteristic of the I/O operation and/or system, including an identity of the calling process or application. That is, in some embodiments, some applications/processes may be configured to be more likely to be subdivided than others. Another criteria could be a size of the I/O operation, where operations involving more data are more likely to get subdivided than operations involving less data. Another criteria could include an identity of a destination volume, a time of day, a particular host id, a particular application or set of applications, particular dataset(s), extents, tracks, records/blocks, etc. As discussed in more detail elsewhere herein, the determination at the step 308 may include balancing criteria that include the criteria discussed above and other factors such as available resources and may include making tradeoffs between conflicting criteria. If it is determined at the step 308 that the other criteria indicate that the I/O operation should not be subdivided, then control transfers from the step 308 to the step 304, discussed above, where an indication is set to cause the I/O operation to not be subdivided. Following the step 304, processing is complete. Alternatively, if it is determined at the step 308 that the other criteria indicates that the I/O operation should be subdivided, then control transfers from the step 308 to a step 312 where an indication is set to cause the I/O operation to be subdivided. Following the step 312, processing is complete.

Figure 7:
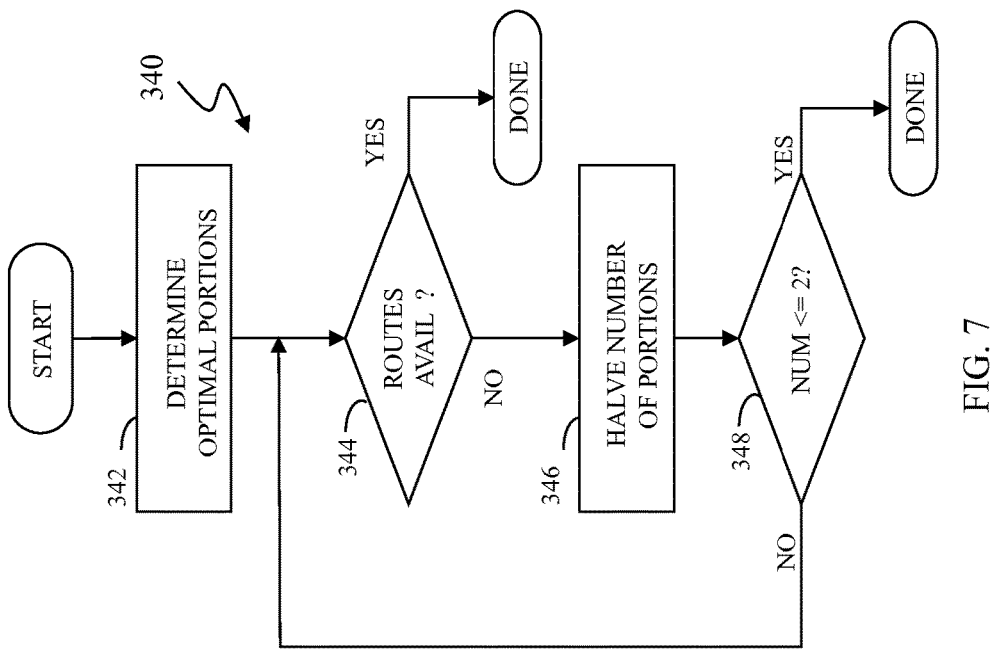
FIG. 7 is a flow diagram illustrating determining a number of subdivisions for an I/O operation according to an embodiment of the system described herein.

Referring to FIG. 7, a flow diagram 340 illustrates in more detail processing performed at the step 252 in the flow diagram 240 of FIG. 5 where an I/O operation is subdivided. Processing begins at a first step 342 where an optimal number of subdivisions is determined based on, for example, a table lookup. Other criteria could include a known optimal size or range of sizes for subdivisions, a formula based, in part, on performance of previous subdivisions, etc. Following the step 342 is a test step 344 where it is determined if there are a sufficient number of parallel I/O routes to handle the number of the subdivisions determined at the step 342 at the same time. For example, if the step 342 indicated that sixteen subdivisions is optimal in a particular situation, but there are only ten parallel I/O routes available for use, then the test at the step 344 would determine that there are not enough I/O routes. Note that, in some embodiments, it may be acceptable to provide a number of subdivisions that exceeds the number of available I/O routes.

If it is determined at the step 344 that enough parallel I/O routes exist, then processing is complete. Otherwise, control transfers from the test step 344 to a step 346 where the number of subdivisions is halved (with appropriate rounding). Following the step 346 is a test step 348 where it is determined if the number of desired subdivisions (after halving) is less than or equal to two. If so, then processing is complete. If not, then control transfers from the test step 348 back to the test step 344 for another iteration.

In some cases, it may be useful to provide a planning tool that helps select candidates for applying I/O subdivision as discussed herein. This may be especially true in instances where a system does not have enough resources to subdivide all I/O operations and/or where clearly some applications/datasets are more critical than others. For example, a system may combine a plurality of relatively low priority back office applications (e.g., data collection and tabulation) with relatively high priority applications that require rapid response (e.g. applications that interact directly with customers). In such a case, it may be useful to have a planning tool to analyze the effects of subdividing certain I/O operations.

Referring to FIG. 8, a flow diagram illustrates using a planning tool to analyze the effects of subdividing I/O operations in a system. Processing begins at a first step 362 where a trial configuration is provided. The trial configuration may indicate which applications/datasets/volumes are to be selected for possibly subdividing I/O operations. In some cases, applications/user with a service level agreement may be preferred. The configuration may include any other information (e.g., thresholds) that may be used during run-time to determine whether to subdivide an I/O operation. Following the step 362 is a step 364 where the system begins tabulation. In an embodiment, running the planning tool does not change any I/O operations. Instead, the planning tool tabulates the expected results if the system were to perform I/O subdivision. For example, the planning tool may determine that a particular I/O operation will take x milliseconds less time if the I/O operation had been subdivided according to the processing described herein. Following the step 364 is a step 366 where the system is run in the usual fashion (i.e., in production), except of course that the planning tool is also running and tabulating information. Following the step 366 is a step 368 where tabulation is terminated. Note that the amount of time between the step 364 (begin tabulation) and the step 368 (end tabulation) can be any amount, such as a day (24 hours) or a work day (i.e., 9 am to 5 pm). Following the step 368, processing is complete.

In an alternative embodiment, it may be possible to adapt the system described herein to subdivide tracks of data. However, in some instances, a storage device may automatically serialize parallel I/O requests for data in different parts of the same track of data, thus negating any efforts to subdivide and process the I/O requests in parallel. For example, a host could subdivide a read request for a track of data into two parallel requests for two different halves of the track only to have the storage device serialize the separate requests, thus eliminating or reducing any benefits from subdividing the track at the host. The system described herein addresses this by causing the storage device to suppress serializing partial track I/O operations when the host has purposely subdivided track I/O operations. This is described in more detail elsewhere herein.

Figure 9:
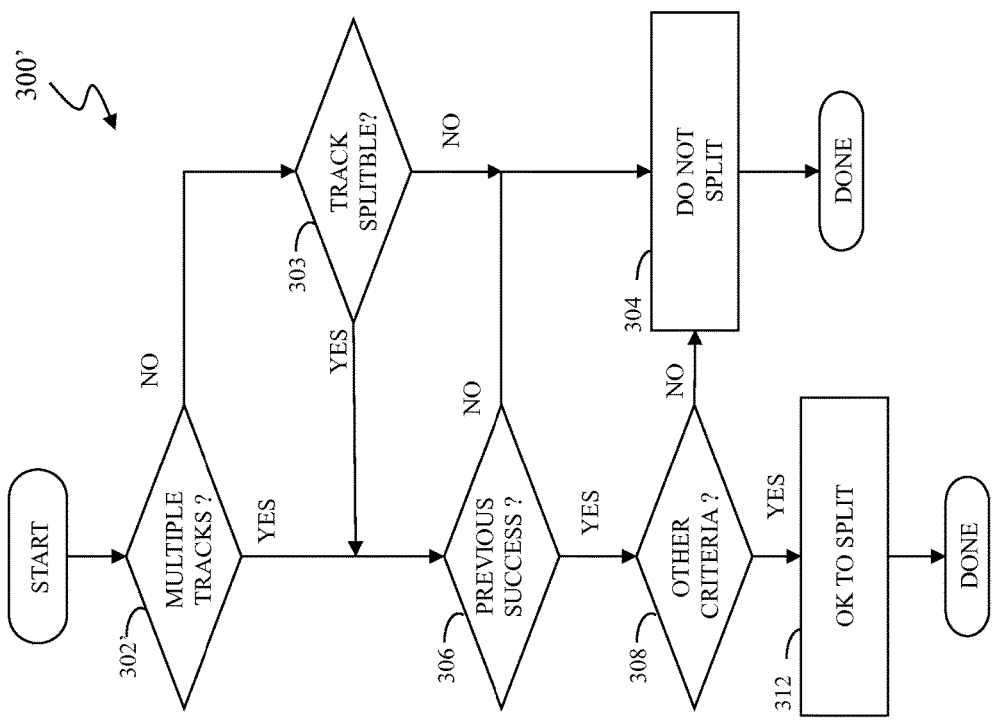
FIG. 9 is a flow diagram illustrating an alternative embodiment of determining whether to subdivide an I/O operation according to an embodiment of the system described herein.

Referring to FIG. 9, a flow chart 300' illustrates an alternative embodiment from that illustrated by the flow chart 300 of FIG. 6. Processing begins at a first test step 302' where it is determined whether an I/O operation is for a plurality of tracks. The test at the step 302' is the same as the test at the step 302 in the flowchart 300 of FIG. 6, described above. If not, then control transfers from the test step 302' to the step 306 where processing proceeds like the processing described above in connection with FIG. 6. Otherwise, if the operation is for a single track, then control transfers from the step 302' to a step 303 where it is determined if the particular storage device being used supports subdividing I/O operations for a single track of data (i.e., supports track splitting). As described elsewhere herein, some types of storage devices may support subdividing I/O for a single track of data into multiple operations while others may not. At the step 303, it is determined if the storage device supports parallel I/O operations for a single track. If not, then control transfers to the step 304, discussed above in connection with the flow chart 300 of FIG. 6, where an indication (e.g., a flag) is set to cause the I/O operation to not be subdivided. Following the step 304, processing is complete. If it is determined at the test step 303 that the storage device supports parallel I/O operations for a single track, then control transfers from the test step 303 to the step 306, where processing proceeds as described above in connection with FIG. 6. Note that it is possible to reach the step 312 (where a flag is set indicating it is OK to split) when the system contains multiple tracks where at least some of the tracks may be splitible.

Figure 10:
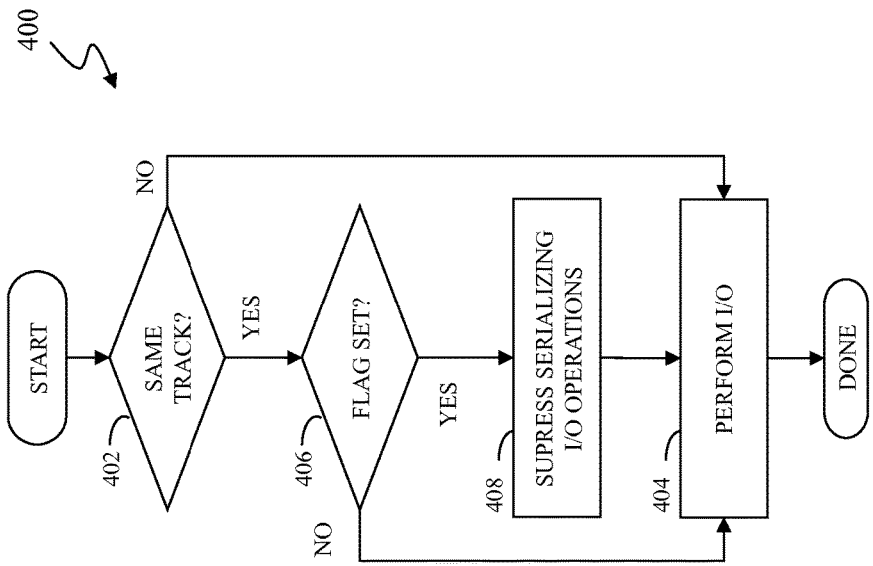
FIG. 10 is a flow diagram illustrating processing performed at a storage device in connection with I/O requests according to an embodiment of the system described herein.

Referring to FIG. 10, a flow diagram 400 illustrates processing performed at a storage device (e.g., the storage device 24) in connection with determining whether to serialize separate I/O requests. Processing begins at a first test step 402 where it is determined whether the separate I/O requests are for the same track (i.e., different portions of the same track). Note also that the test at the step 402 is performed for all I/O received at the storage device. If the separate I/O requests are not for the same track, then control transfers from the test step 402 to a step 404 where the I/O requests are processing in a conventional fashion. Following the step 404, processing is complete.

If it is determined at the test step 402 that the separate I/O requests are for the same track, then control transfers from the test step 402 to a test step 406 where it is determined if a flag (or similar) is set indicating that the requests are provided with special processing. As discussed elsewhere herein, a devices storing data at the storage device (e.g., the host 22) may set a flag or use a similar mechanism to indicate that separate I/O requests for the same track are not to be serialized. In some embodiments, it is also determined at the step 406 if the I/O operations are from the same host. In some cases, I/O operations from different hosts may be serialized even if the flag is set at the step 406. If it is determined at the step 406 that the flag is set (indicating that the separate I/O requests are not to be serialized), then control transfers from the test step 406 to a step 408 where serialization of the separate I/O operations for the same track of data (i.e., different parts of the same track of data) is suppressed to cause each of the I/O operations to potentially be performed at the same time or nearly the same time (i.e., in parallel). Following the step 408 is the step 404, discussed above, where I/O requests are serviced in a conventional fashion. Following the step 404 processing is complete. If it is determined at the step 406 that the flag is not set (indicating that the separate I/O requests are to be serialized, in a conventional fashion), then control transfers from the test step 406 to the step 404, discussed above. Not performing the step 408 causes I/O requests for the same track to be serialized (i.e., default handling). At the step 404, I/O requests are serviced in a conventional fashion. Following the step 404 processing is complete.

Figure 11B:
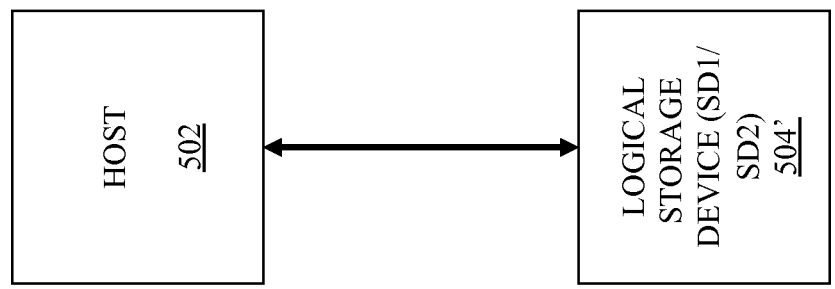
FIG. 11B is a schematic illustration of a host computing device coupled to a logical device corresponding to two separate storage devices according to an embodiment of the system described herein.
Figure 11A:
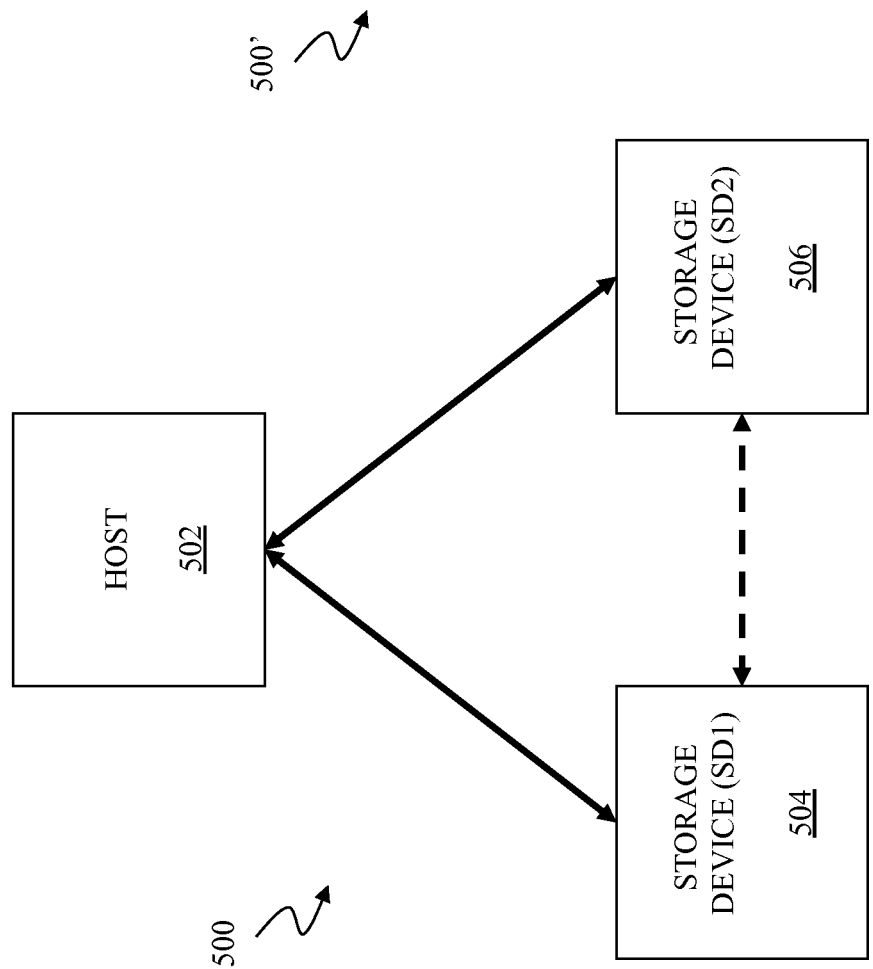
FIG. 11A is a schematic illustration of a host computing device coupled to two separate storage devices according to an embodiment of the system described herein.

Referring to FIG. 11A, a diagram 500 shows a host 502 coupled to a first storage device 504 (SD1) and a second storage device 506 (SD2). The host 502 may be coupled directly to one or both of the storage devices 504, 506 using any appropriate coupling mechanism, such as FICON or a Fibre Channel connection, or may be coupled to one or both of the storage devices indirectly using, for example, a switch/SAN, an Internet connection, etc. The storage devices 504, 506 may be coupled to each other and may be configured to have stored thereof essentially the same data using appropriate mirroring technology, such as the RDF technology provided by EMC Corporation of Hopkinton, Mass. Data is mirrored on the storage devices 504, 506 using the coupling therebetween. The storage devices 504, 506 provide a redundancy so that of one of the storage devices 504, 506 fails, operation of the host 502 may continue using the other one of the devices 504, 506 without interruption of service.

Generally, a host may be coupled to a storage device using multiple parallel paths (in some cases up to eight paths). In an embodiment herein, the parallel paths that would otherwise be used to couple a single storage device to the host 502 are used to couple the two separate storage devices 504, 506 to the host 502. In prior art systems, such a configuration would result in an error causing at least one of the storage devices 504, 506 to be logically disconnected from the host 502. However, as described in more detail elsewhere herein, the host 502 provides special processing that allows coupling the host 502 to the two storage devices 504, 506 using a set of paths that would otherwise be used for only one storage device.

Referring to FIG. 11B, the first storage device 504 and the second storage device 506 appear to the host 502 as a single logical storage device 504'. Although the storage devices 504, 506 are physically separate, logically the storage devices 504, 506 are accessed as a single logical device 504' by drivers and applications of the host 502. This is described in more detail elsewhere herein.

Figure 12:
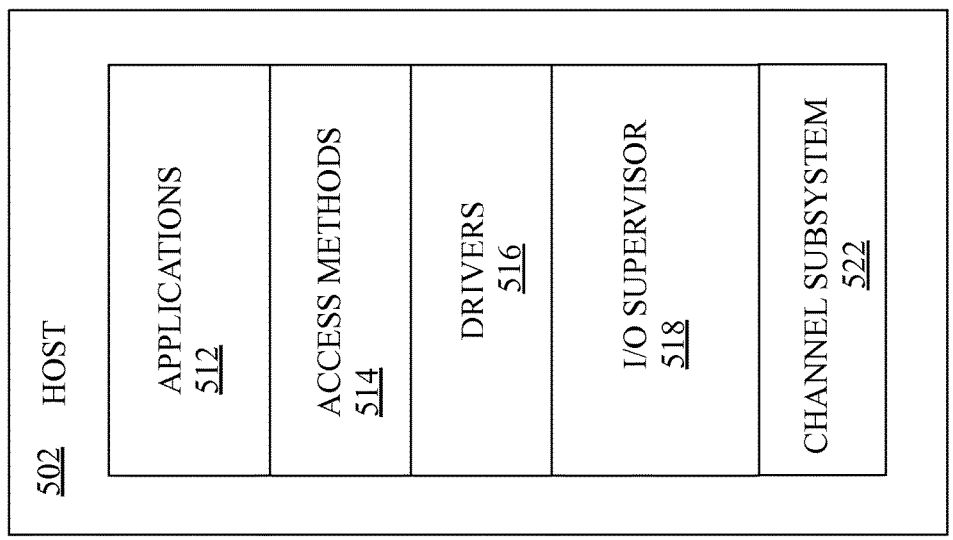
FIG. 12 is a schematic illustration showing abstraction layers in a host according to an embodiment of the system described herein.

Referring to FIG. 12, the host 502 is shown in more detail as including an applications layer 512, an access methods layer 514, a drivers layer 516, an I/O supervisor layer 518, and a channel subsystem 522. The applications layer 512 includes one or more software applications that run on the host 502. The access methods layer 514 includes I/O routines (e.g., read, write, open, etc.) that are used by applications in the applications layer 512 in connection with performing I/O operations. Software in the applications layer 512 calls specific routines in the access methods layer 514 to access data on a storage device coupled to the host 502.

The I/O routines in the access methods layer 514 call driver routines in the drivers layer 516 that perform lower-level device specific operations that depend upon the specific type of I/O device and the type of connection thereto. For example, a first driver for a Symmetrix storage device coupled to the host 502 by a FICON connection may be different than a second driver used for a different type of non-volatile storage device coupled to the host 502 using a different type of connection. Note, however, that an application in the applications layer 512 may call the same routine (e.g., read) in the access methods layer 514 irrespective of the physical hardware (and connection there) used for the data, but that the routine in the access methods layer 514 that is called may call different routines in the drivers layer 516, depending upon a specific configuration/hardware of the system.

The channel subsystem layer 522 includes mechanisms that directly control the hardware used for I/O operations, including any storage devices and channels used for transferring data between the host 502 and the storage devices 504, 506. The I/O supervisor layer 518 mediates between the drivers layer 516 and the channel subsystem layer 522. Routines in the drivers layer 516 call routines in the I/O supervisor layer 518 to perform hardware operations and to transfer data to and from the host 502 and to exchange status and control information to facilitate control of devices coupled to the host 502. The I/O supervisor layer 518 makes direct calls to the channel subsystem layer 522 to perform operations requested by routines in the drivers layer 516 and to return data from the channel subsystem layer 522 (provided by devices couple to the host 502) to routines in the drivers layer 516.

The system described herein may be implemented by making appropriate modifications to the I/O supervisor layer 518, as described in more detail elsewhere herein. Generally, routines in the applications layer 512, the access methods layer 514, and the drivers layer 516 access the single logical storage device 504' and have no awareness that the single logical storage device 504' is implemented using the two separate physical storage devices 504, 506. Generally, routines at the layers 512, 514, 516 do not determine which of the storage devices 504, 506 receive command or data or provide results to the host 502. In contrast, the channel subsystem 522 deliberately and separately accesses each of the storage devices 504, 506 based on specific instructions provided by routines in the I/O supervisor layer 518.

Figure 13:
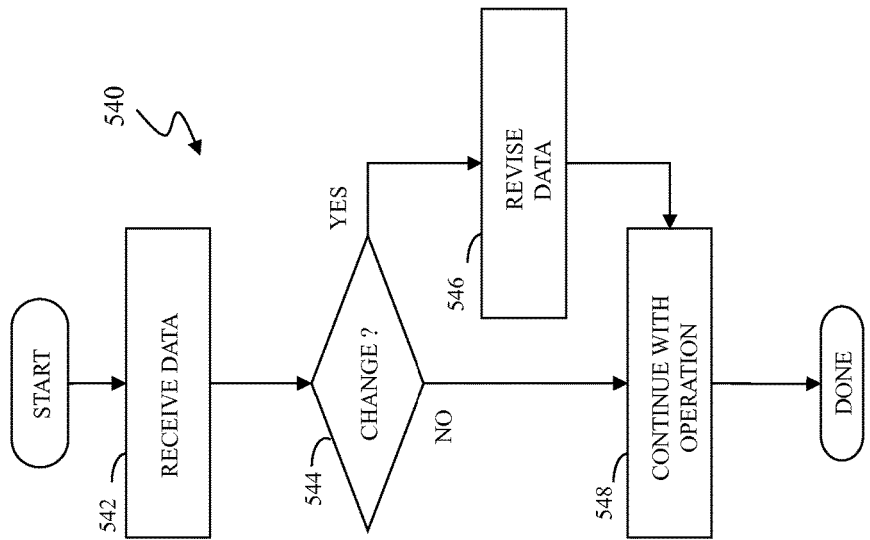
FIG. 13 is a flow diagram illustrating processing performed by a host in connection with receiving data/metadata according to an embodiment of the system described herein.

Referring to FIG. 13, a flow diagram 540 illustrates processing by the I/O supervisor layer 518 in connection with the host 502 receiving data and/or status information (metadata) from one of the storage devices 504, 506. The metadata includes control information used to access a device. Processing begins at a first step where the data/metadata is received from the channel subsystem layer 522. Following the step 542 is a test step 544 where it is determined if modifications are needed to the received data/metadata. In an embodiment herein, the routines at the layers 512, 514, 516 are made to see the separate storage devices 504, 506 as a single logical device. This may be accomplished by "spoofing" the data so that all data from either the storage device 504 or the storage device 506 appears to be coming from only one of the storage devices 504, 506 (e.g., from the storage device 504). In such a system, data/metadata from the storage device 504 would be generally unchanged when received by the host 502 while data/metadata from the storage device 506 would be modified to appear as if the data/metadata had come from the storage device 504. The modifications may include revising storage device identifiers (e.g., serial numbers, port identifiers, etc.). Note that some of the data that is spoofed includes data structures used for I/O operations and maintained at the I/O supervisor layer 518.

If it is determined at the step 544 that the received data needs to be modified, then control transfers from the test step 544 to a step 546 where the data/metadata is modified to appear to have come from a different one of the storage devices 504, 506. Generally, the routines at the layers 512, 514, 516 will not be able to determine which of the storage devices 504, 506 provided the data/metadata. Following the step 546 is a step 548, which is also reached from the test step 544 if the data/metadata does not need to be changed. At the step 548, the I/O operation continues (e.g., the data/metadata is provided to a calling routine from the drivers layer 516). Following the step 548, processing is complete.

In an embodiment herein, the system may be allowed to start in a usual fashion, and thus path(s) to one of the storage devices 504, 506 may be deemed unavailable. Subsequently, the system may provide the processing described herein to make the path(s) available (i.e., reset/join, etc.) by spoofing the host 502 and presenting the separate storage devices 504, 506 as a single logical device.

Figure 14:
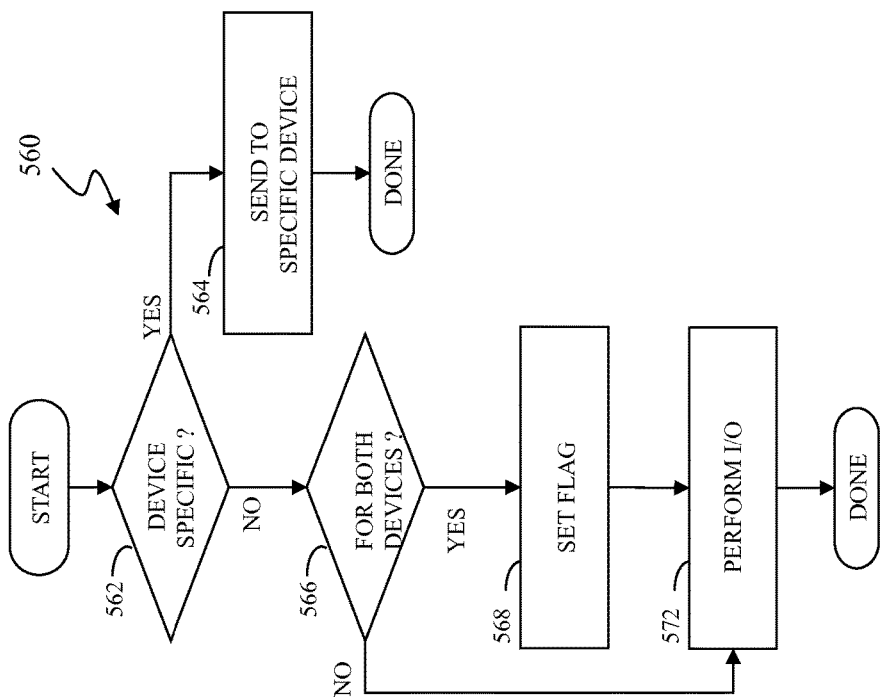
FIG. 14 is a flow diagram illustrating processing performed by a host in connection with sending data/metadata according to an embodiment of the system described herein.

Referring to FIG. 14, a flow diagram 560 illustrates operations performed in connection with the host 502 sending commands (data/metadata) to the storage devices 504, 506. As discussed elsewhere herein, the storage devices 504, 506 are maintained to have the same data thereon using appropriate mirroring technology, such as RDF technology. This mirroring technology may be independent of the host 502. Thus, in some cases, data/metadata needs to be written to a single one of the storage devices 504, 506 by the host 502 and the mirroring technology will handle propagating the data/metadata to the other one of the storage devices 504, 506 without further intervention by the host 502. However, in some instances, such as state change operations and device reservations, the data/metadata is propagated to both of the storage devices 504, 506. For example, if for some reason it is desirable to issue a command to reserve storage block X, the reserve command needs to be sent to both of the storage devices 504, 506 to be effective. Although it is possible to have the host 502 issue two separate commands to the two separate storage devices 504, 506, in an embodiment herein, a receiving one of the storage devices 504, 506 (that receives the command from the host 502) issues the command to the other one of the storage devices using the connection between the storage devices 504, 506. This is explained in more detail elsewhere herein.

Note also that, in some instances, a particular command may only need to be sent to one of the storage devices 504, 506. For example, if a particular one of the storage devices 504, 506 is unresponsive and needs to be reset, the reset command is sent to only the particular one of the storage devices 504, 506 and not to both of the storage devices 504, 506 (and not to the wrong one of the storage devices 504, 506).

Processing for the flow diagram 560 begins at a first test step 562 where it is determined if the particular data/metadata being transmitted by the host 502 corresponds to a device specific command (e.g., a reset command for a specific one of the storage devices 504, 506). If so, then control transfers from the test step 562 to a step 564 where the routine in the I/O supervisor layer 518 makes a call to the channel subsystem layer 522 to cause the data/metadata to be sent to the particular one of the storage devices 504, 506. Following the step 564, processing is complete.

If it is determined at the test step 562 that the data/metadata being sent by the host is not to be directed to a specific one of the storage devices 504, 506, then control transfers from the test step 562 to a test step 566 where it is determined if the data/metadata corresponds to a command (or similar) that is to be sent to both of the storage devices (e.g., a command to reserve a particular block of storage space). If so, then control transfers from the test step 566 to a step 568 where a flag is set to indicate to the receiving one of the storage devices 504, 506 that the received command is to be sent to the other one of the storage devices 504, 506 via the link therebetween. This is discussed in more detail elsewhere herein. Note that the flag can be in appropriate form, including a bit (or number of bits) set in the metadata being transmitted by the host 502. Following the step 568 is a step 572 where the I/O operation is performed and the data is sent to one of the storage devices 504, 506. The step 572 is also reached from the test step 566 if it is determined that the data/metadata being sent does not need to go to both of the storage devices 504, 506. Note that, at the step 572, the data/metadata can be sent to either of storage devices 504, 506. The system may choose which of the storage devices 504, 506 receive the data/metadata based on load balancing considerations, random selection, etc. Following the step 572, processing is complete.

In an embodiment herein, the system may include provisions for avoiding a "deadly embrace" where the host 502 obtains a resource from one of the storage devices 504, 506 but cannot obtain a corresponding resource from an other one of the storage devices 504, 506. When the host 502 obtains a first resource but cannot obtain a corresponding second resource, the host 502 may simply release the first resource.

Figure 15:
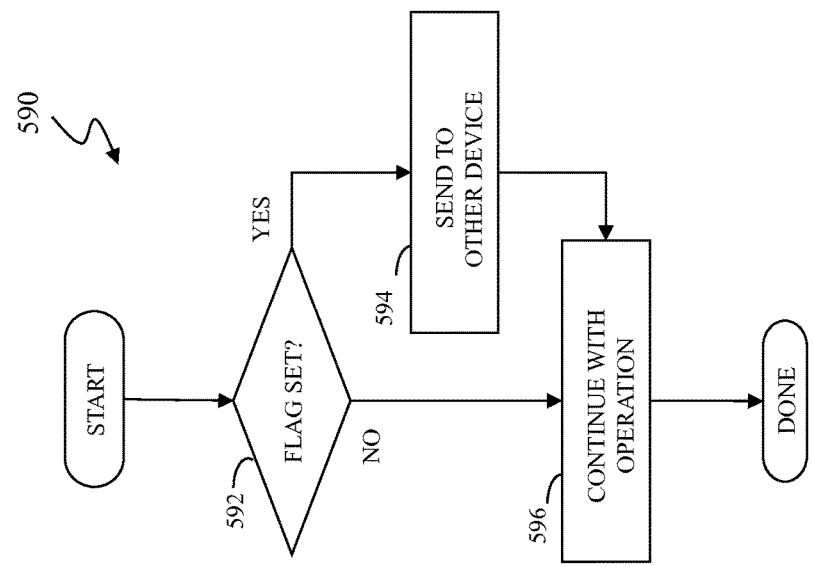
FIG. 15 is a flow diagram illustrating processing performed by a storage device in connection with receiving data/metadata from a host according to an embodiment of the system described herein.

Referring to FIG. 15, a flow diagram 590 illustrates processing performed at a receiving one of the storage devices 504, 506 that receives data/metadata from the host 502. Processing begins at a first step 592 where it is determined if a flag is set. The flag corresponds to the flag that may have been set at the step 568, discussed above. The flag being set indicates that the corresponding data/metadata contains a command that needs to be provided to the other one of the storage devices 504, 506. If it is determined at the step 592 that the flag is set, then control transfers from the step 592 to a step 594 where the data/metadata is provided to the other one of the storage devices 504, 506 using the link therebetween. In an embodiment herein, the data/metadata may be provided by including an indicator (e.g., a marker or a flag) in the data/metadata to indicate that what is being sent corresponds to a command from the host 502. Following the step 594 is a step 596 where the data/metadata is processed at the receiving one of the storage devices 504, 506 and the system continues with the operation to be performed (e.g., store the data, execute a command, etc.). Note that the step 596 is reached directly from the step 592 if the flag is not set. Following the step 596, processing is complete.

Figure 16:
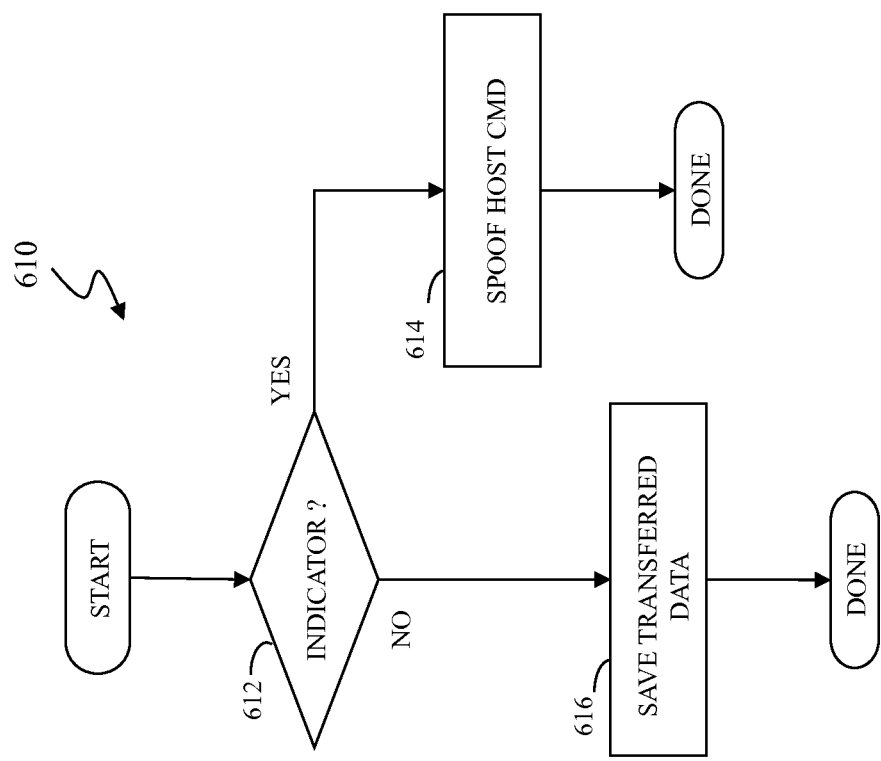
FIG. 16 is a flow diagram illustrating processing performed by a storage device in connection with receiving data/metadata from another storage device according to an embodiment of the system described herein.

Referring to FIG. 16, a flow diagram 610 illustrates processing performed at each of the storage devices 504, 506 in connection with receiving data over the data link therebetween. Generally, data to be mirrored between the storage devices 504, 506 is provided via the data link. However, as discussed elsewhere in, in some cases, commands may be sent from the host 502 to one of the storage devices 504, 506 and then relayed to the other one of the storage devices 504, 506 using the link therebetwen. Processing begins at a first step 612 where it is determined if the received data/metadata includes an indicator (set at the step 594, described above). If so, then control transfers form the step 612 to a step 614 where the data/metadata is processed by spoofing the receiving one of the storage devices 504, 506 to cause processing of the data/metadata to be performed as if the corresponding command had been issued directly by the host 502 via the link from the host 502 to the receiving one of the storage devices 504, 506. Following the step 614, processing is complete.

If it is determined at the step 612 that the received data/metadata does not include an indicator, then control transfers from the test step 612 to a step 616 where the received data/metadata saved at the receiving storage device. Following the step 616, processing is complete.

Note that the system described herein may be adapted to work with any operating system. In some cases, the adaptation may include modification of drivers. Note also that the system may be adapted to operating inside the storage device by subdividing I/O requests from host (or similar) devices as the requests are received. In addition, in instances where parallel I/O routes exist between storage devices in connection with RDF transfer, adapting the system to operate inside a storage device may allow the storage device to subdivide I/O operations prior to transferring data to a remote storage device.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of accessing a plurality of separate physical storage devices as a single logical device, comprising:

receiving data and metadata from the plurality of separate physical storage devices;

causing, while the plurality of physical storage devices are actively providing data to a host in a plurality of I/O operations, the data and metadata to appear to be coming from a particular one of the plurality of separate physical storage devices by spoofing data and metadata from a different one of the plurality of separate physical storage devices to appear to be coming from the particular one of the plurality of separate physical storage devices;

subdividing at least one of the plurality of I/O operations into a plurality of subdivided I/O operations for different portions of data corresponding to the at least one of the plurality of I/O operations, wherein at least two of the different portions of data are from a single track of data on one of the plurality of physical storage devices;

refraining from serializing the plurality of subdivided I/O operations based on a flag indicating that separate I/O requests for a same track are not to be serialized; and the host continuing to access data by performing the I/O operations on the plurality of separate physical storage devices following causing the data and metadata to appear to be coming from a particular one of the plurality of separate physical storage devices.

2. A method, according to claim 1, further comprising:

determining if metadata is to be provided to a specific one of the plurality of separate physical storage devices or for any one of the plurality of separate physical storage devices;

directing the metadata to the specific one of the plurality of separate physical storage devices in response to the metadata to be provided to the specific one of the plurality of separate physical storage devices, wherein data initially directed to one of the plurality of separate physical storage devices is modified to be directed to an other one of the plurality of separate physical storage devices; and directing the metadata to any one of the plurality of separate physical storage devices in response to the metadata to be provided to any one of the storage devices.

3. A method, according to claim 2, wherein following directing the metadata to any one of the plurality of separate physical storage devices, the any one of the plurality of separate physical storage device forwards the metadata to an other one of the plurality of separate physical storage devices using a data link therebetween.

4. A method, according to claim 3, wherein the other one of the plurality of separate physical storage devices handles metadata received via the data link as if the metadata were provided directly by a host.

5. A method, according to claim 1, wherein the spoofing of the data and metadata includes revising storage device identifiers.

6. A method, according to claim 5, wherein the storage device identifiers include serial numbers and port identifiers.

7. A non-transitory computer-readable medium containing software that accesses at least two separate physical storage devices as a single logical device, the software comprising:

executable code that receives data and metadata from the at least two separate physical storage devices;

executable code that causes the data and metadata to appear to be coming from a particular one of the at least two separate physical storage devices while the at least two physical storage devices are actively providing data to a host in a plurality of I/O operations by spoofing data and metadata from different one of the plurality of separate physical storage devices to appear to be coming from the particular one of the at least two separate physical storage devices;

executable code that subdivides at least one of the plurality of I/O operations into a plurality of subdivided I/O operations for different portions of data corresponding to the at least one of the plurality of I/O operations, wherein at least two of the different portions of data are from a single track of data on one of the at least two physical storage devices;

executable code that refrains from serializing the plurality of subdivided I/O operations based on a flag indicating that separate I/O requests for a same track are not to be serialized; and executable code that continues to access data by performing the I/O operations on the plurality of separate physical storage devices for the host following causing the data and metadata to appear to be coming from a particular one of the plurality of separate physical storage devices.

8. A non-transitory computer-readable medium, according to claim 7, further comprising:

executable code that determines if metadata is to be provided to a specific one of the plurality of separate physical storage devices or for any one of the at least two separate physical storage devices;

executable code that directs the metadata to the specific one of the at least two separate physical storage devices in response to the metadata to be provided to the specific one of the storage devices, wherein data initially directed to one of the at least two separate physical storage devices is modified to be directed to the other one of the at least two separate physical storage devices; and executable code that directs the metadata to any one of the at least two separate physical storage devices in response to the metadata being provided to any one of the at least two separate physical storage devices.

9. A non-transitory computer-readable medium, according to claim 8, wherein following directing the metadata to any one of the at least two separate physical storage devices, the any one of the at least two separate physical storage device forwards the metadata to an other one of the at least two separate physical storage devices using a data link therebetween.

10. A non-transitory computer-readable medium, according to claim 9, wherein the other one of the at least two separate physical storage devices handles metadata received via the data link as if the metadata were provided directly by a host.

11. A non-transitory computer-readable medium, according to claim 8, wherein the spoofing of the data and metadata includes revising storage device identifiers.

12. A non-transitory computer-readable medium, according to claim 11, wherein the storage device identifiers include serial numbers and port identifiers.

13. A system, comprising:

a first storage device;

a second storage device coupled to the first storage device; and a host that accesses the first and second storage devices in a plurality of I/O operations as a single logical device, wherein the host receives data and metadata from the first and second storage devices and causes the data and metadata to appear to be coming from only the first storage device while the first and second storage devices are actively providing data to the host by spoofing data and metadata from the second storage device to appear to be coming from the first storage device, the host subdividing at least one of the plurality of I/O operations into a plurality of subdivided I/O operations for different portions of data corresponding to the at least one of the plurality of I/O operations, wherein at least two of the different portions of data are from a single track of data on one of the first or second storage devices, the host refraining from serializing the plurality of subdivided I/O operations based on a flag indicating that separate I/O requests for a same track are not to be serialized, wherein the host continues to access data by performing the I/O operations on the first and second storage devices following causing the data and metadata to appear to be coming from a particular one of the first and second storage devices.

14. A system, according to claim 13, wherein the host determines if metadata is to be provided to a specific one of the first and second storage devices or for any one of the first and second storage devices, directs the metadata to the specific one of the first and second storage devices in response to the metadata to be provided to the specific one of the first and second storage devices, wherein data initially directed to one of the first and second storage devices is modified to be directed to the other one of the first and second storage devices and directs the metadata to any one of the first and second storage devices in response to the metadata to be provided to any one of the first and second storage devices.

15. A system, according to claim 14, wherein following directing the metadata to any one of the first and second storage devices, the any one of the first and second storage device forwards the metadata to an other one of the first and second storage devices using a data link therebetween.

16. A system, according to claim 15, wherein the other one of the first and second storage devices handles metadata received via the data link as if the metadata were provided directly by a host.

17. A system, according to claim 13, wherein spoofing data and metadata includes revising storage device identifiers.

18. A system, according to claim 17, wherein the storage device identifiers include serial numbers and port identifiers.

* * * * *